Figure 4:
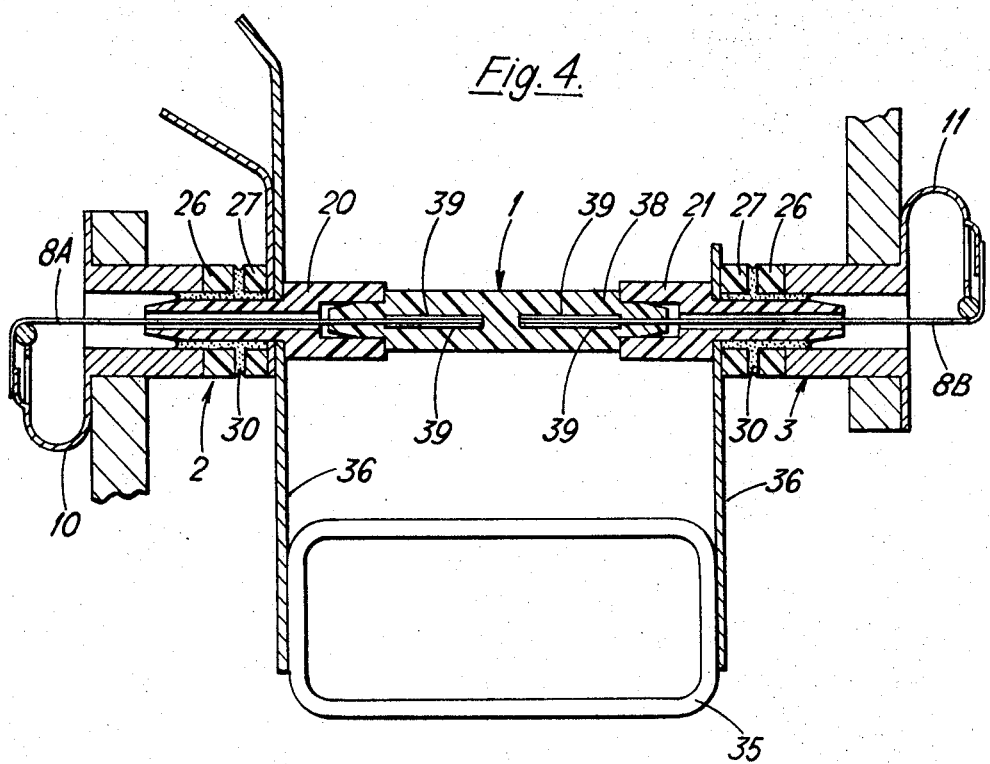

United States Patent

[11] 3,590,375

[72] Inventor Frederick A. Sills
London, England
[21] Appl. No. 813,852
[22] Filed Apr. 7, 1969
[45] Patented June 29, 1971
[73] Assignee Crompton Parkinson Limited
Aldwych, London, England
[32] Priority Apr. 11, 1968
[33] Great Britain
[31] 17,542/68

[54] ELECTRICAL MEASURING INSTRUMENTS
4 Claims, 5 Drawing Figs.
[52] U.S. Cl. .................................................. 324/154 R
[51] Int. Cl. .................................................. G01r 1/00
[50] Field of Search ........................................... 324/154,
155, 146, 147

[56] References Cited
UNITED STATES PATENTS
2,623,083 12/1952 Schlumberger .............. 324/154 X
FOREIGN PATENTS
518,759 3/1940 Great Britain ................ 324/154
1,056,262 4/1959 Germany ...................... 324/147
Primary Examiner—Alfred E. Smith
Attorney—Kemon, Palmer & Estabrook ABSTRACT: An electrical measuring instrument of the kind in which the rotary moving part is supported at each end by an axially extending tensioned filament and in which the body of the moving part is formed as a moulding of plastics material in which the filament at each end is embedded.

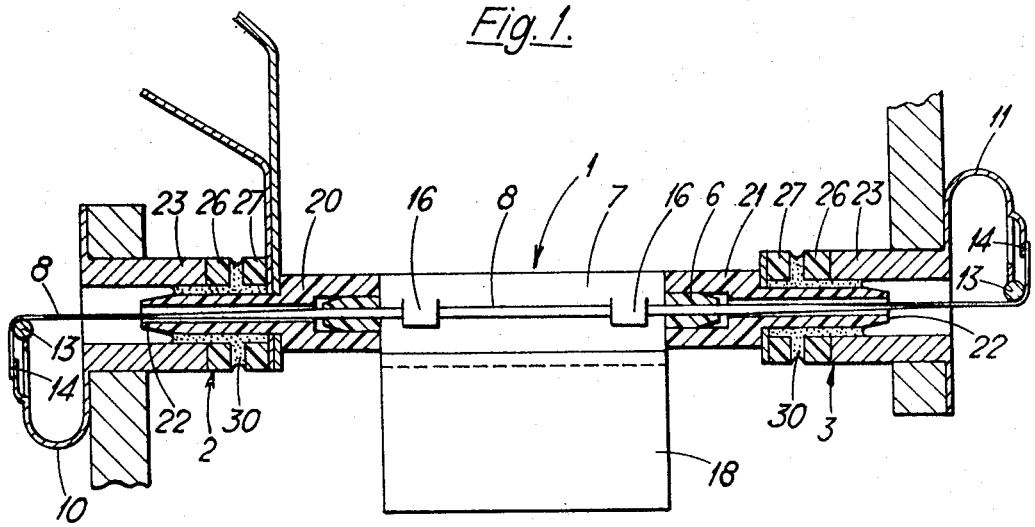
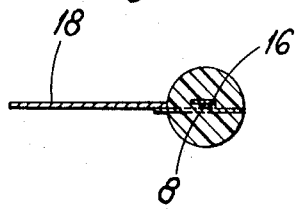
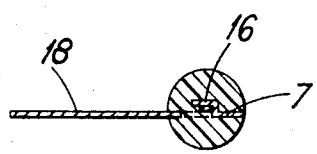

ELECTRICAL MEASURING INSTRUMENTS

This invention relates to electrical measuring instruments of the kind in which the rotary moving part is mounted at each end by means of an axially extending tensioned filament instead of a pivot. This is commonly referred to as a taut ribbon or taut band suspension and is coming into increasing use in view of the much greater resistance to shock which is obtained with this form of suspension. With such a construction the filament at each end has to be secured between an outer spring which applies the necessary tension and, after passing around a guide in the form of a small roller or pin, to point on the moving part. The components involved are normally extremely small and the securing in position of the filaments, particularly at the end adjacent the moving part is a tedious and time-consuming operation. The moving part itself is normally formed of a light metal such as aluminum and the end of the filament needs to be secured, for example by means of soldering.

According to the present invention the body of the moving part is formed as a moulding of plastics material in which the filament at each end is embedded so that the filament is held in position by the moulding operation and no separate securing is necessary. This greatly simplifies the operation since the moulding is automatic and can be carried out with much greater consistency than the previous manual operation.

Instruments in accordance with the invention may be either of the moving iron or moving coil types and if the former the construction may be still further simplified by the use of a single length of filament to support the moving part at both ends. In other words a single length of filament extends right through the body of the moving part so that the tension at the two ends is resisted by the continuity in the filament itself.

In order to mould such a construction the continuous length of filament is located in a mould and the plastics material is then injected round the body of the filament. In some cases it may be found that the entry of the liquid moulding material tends to displace the filament and to avoid this a rigid core may be provided within the body of the moving part so as to locate the filament accurately. If this core is of metal it may extend to the edge of the body so that the moving iron is secured directly to the core. Alternatively the core may be formed as part of the moving iron itself so as to reduce the number of components needed.

With a moving coil type of instrument it is normally not possible to use a single length of filament since the usual practice is to use the filaments at each end to lead the current to and from the moving coil. Under these circumstances the lengths of filament at the two ends must, of course, be isolated from one another. Without the continuity of filament throughout the body of the moulding to resist the tension at the two ends it is necessary to secure the inner end of each separate length to an insert in the moulding. Even with this minor additional complication the assembly is very much simpler than when securing the end of a filament directly to a metal portion of the moving part.

Figure 5:
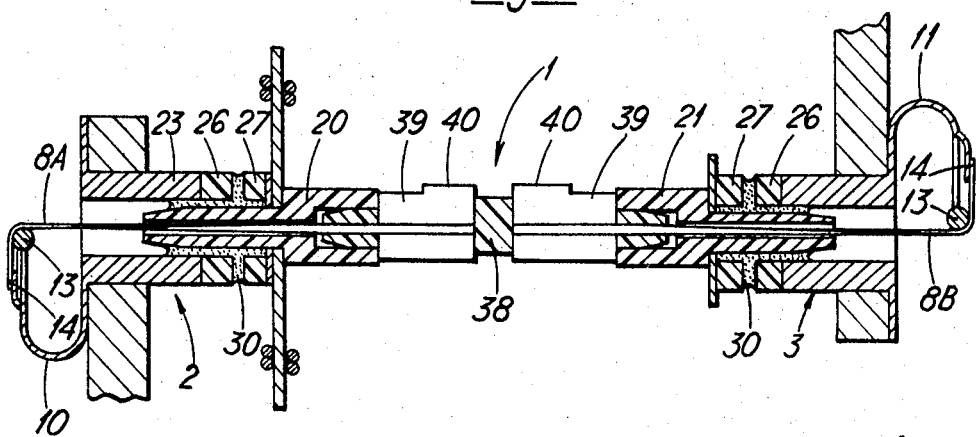

Constructions in accordance with the invention will now be described by way of example with reference to the accompanying drawings in which:

FIG. 1 is an axial sectional view of a moving iron instrument showing the moving part and its end supports, FIG. 2 is a transverse section through the middle of the moving part, FIG. 3 is a view corresponding to FIG. 2 of a slightly modified construction, FIG. 4 is a view similar to FIG. 1 of a moving coil instrument, and, FIG. 5 is a view corresponding to FIG. 4 but with the moving coil displaced through an angle of 90°.

Turning first to FIG. 1 the moving part is indicated generally as 1 and the stationary supporting structure at the two ends as 2 and 3. The body of the moving part 1 is in the form of a plastic moulding 6 having a rigid core 7. The moving part is supported at both ends by a filament 8 which extends right through the center of the body 6 so that the continuity of the filament withstands the tension imposed by springs 10 and 11 mounted on the respective end supports 2 and 3. At each end the filament passes round a pin 13 and is soldered to the respective spring at 14.

In order to mould the body portion 6 around the filament 8 the latter is inserted in the mould before the moulding operation together with the core 7. In order to prevent the filament 8 being displaced by the introduction of the plastic the core 7 is formed with a pair of lugs 16 which locate the filament 8 as best seen in FIG. 2. This ensures that the filament 8 is held centrally and thus emerges centrally at each end of the body. The core 7 extends slightly beyond the edge of the body and the moving iron 18 is secured to this projecting edge as seen in FIG. 2.

In order to restrict lateral movement of the moving part 1 in relation to its supports the body 6 is fitted with tubular extensions 20 and 21 which are moulded separately and constitute a push fit on the body 6. Each of the tubular extensions is formed with a spigot 22 which extends within a bushing 23 at each end. In addition damping is provided as described in U.S. Pat. application Ser. No. 642,021 by means of a pair of annular washers 26 and 27 at each end. These washers are formed of a cellular elastomer having a closed cell structure but with a layer of open cells on their facing surfaces. At each end the washer 26 is fixed to the bushing 23 while the washer 27 is fixed to the moving part 1. A layer of viscous liquid 30 between the facing surfaces of the two washers and also between the spigot 22 and the bushing 23 is held in position by surface tension to provide the necessary damping effect.

The fact that the filament 8 is continuous through the center of the body 6 avoids the need for it to be secured firmly to the body but this is only possible since the instrument is of the moving iron type and there is no need to carry current to the moving part 1. An alternative construction for an instrument of the moving iron type is shown in FIG. 3 where the moving iron 18 and the core 7 are formed integrally with one another.

FIGS. 4 and 5 show a construction of moving coil instrument where two separate lengths of filament are used to support the moving part which is again indicated as 1. The end supports and the damping arrangements are exactly the same as illustrated in FIG. 1 and are indicated by the same reference numerals. The two separate filaments are, however, shown as 8A and 8B. The moving coil itself is shown as 35 and is supported by arms 36, being of the offset type necessary for an instrument with a range of movement of the order of 250°.

The current to the moving coil 35 is conducted along the two filaments 8A and 8B and these therefore need to be isolated from one another and thus to be anchored firmly in the body which is shown as 38. For this purpose the end of each filament is sandwiched between a pair of identically shaped thin inserts 39 for example by means of welding. As seen from FIG. 4 these inserts are firmly embedded within the body 38 and thus withstand the considerable tension applied by the springs 10 and 11 to the filaments 8A and 8B. As seen from FIG. 5 the inserts 39 extend to the edges of the body 38 and are formed with projecting tags 40 for securing the connectors to the moving coil 35. The body portion 38 is fitted with similar tubular extensions 20 and 21 to restrict its lateral movement.

As an alternative to the sandwiched construction shown, the ends of the filaments 8A and 8B may be secured to other forms of inserts such as brass pins, for example, or may merely be bent back on themselves to form a key in the moulding. The moulding itself is preferably formed from glass-filled nylon but various other plastics may also be used.

I claim:

1. In an electrical instrument of the moving coil type having a stator and a rotary moving part supporting the coil and tensioned filament means supporting said moving part at each end, the improvement which comprises:

a body for said moving part formed of a moulded plastic material;

separate lengths of tensioned filament supporting said moving part at its opposite ends; and at least two inserts moulded in said moving part, one attached to the inner end of each of said filaments respectively.

2. An electrical measuring instrument according to claim 1, and including two paris of inserts, the inner end of each said length of filament being secured between a pair of said inserts.

3. In an electrical measuring instrument of the kind having a stator, a rotary moving part and an axially extending tensioned filament supporting said moving part at each end within said stator, the improvement which comprises a body for said moving part formed as a moulding of plastic material, said filament being embedded in said moulding at each end, said moving part including at each end a tubular extension surrounding said filament and a pair of bushes on said stator, each said bush surrounding a respective tubular extension whereby to restrict lateral movement of said moving part.

4. An electrical measuring instrument according to claim 3 wherein said tubular extensions are formed as separate mouldings and are mechanically connected to said moving part.